United States Patent [19]
Gabor

[11] 3,751,693
[45] Aug. 7, 1973

[54] MOVING COIL MOTOR WITH NO STRAY FLUX

[75] Inventor: Andrew Gabor, Danville, Calif.

[73] Assignee: Diablo Systems, Incorporated, Hayward, Calif.

[22] Filed: Feb. 14, 1972

[21] Appl. No.: 226,139

[52] U.S. Cl. 310/13
[51] Int. Cl. H02k 41/02
[58] Field of Search 310/12-14, 27; 179/115.5, 119, 170

[56] References Cited

UNITED STATES PATENTS

| | | | |
|---|---|---|---|
| 3,505,544 | 4/1970 | Helms | 310/13 |
| 3,439,198 | 4/1969 | Lee | 310/13 |
| 3,659,124 | 4/1972 | Lathrop | 310/27 X |
| 3,599,020 | 8/1971 | Harris et al. | 310/13 |

*Primary Examiner*—D. F. Duggan
*Attorney*—Paul D. Flehr, Jerry G. Wright et al.

[57] ABSTRACT

A voice coil motor for driving the read/write heads of a magnetic disk drive unit includes an outer elongated enclosure of square cross section and an inner enclosure of similar configuration both of which serve as pole pieces for elongated magnets which are affixed to the inner walls of the outer enclosure. The permanent magnets are polarized so that their axes are perpendicular to the coincident center axis of the elongated enclosures. A slidable element is mounted on a rod extending along this center axis, the slidable element driving the read/write head through an aperture in the end plate of the enclosures. An electric coil of square cross section is mounted in an air gap between the inner pole pieces and the permanent magnets by support fingers which extend through slots in the corner of the pole pieces the supports extending from the movable carrier. By this arrangement all of the flux is contained within the rectangular enclosure and practically no stray flux influences the magnetic recording medium.

3 Claims, 3 Drawing Figures

MOVING COIL MOTOR WITH NO STRAY FLUX

BACKGROUND OF THE INVENTION

This invention relates to a voice coil motor having a negligible amount of stray magnetic flux and more particularly to a motor for driving the read/write heads of a magnetic disk drive unit.

In using voice coil type motors to drive the read/write heads of a disk drive two problems have been present. First, a relatively large excursion of the armature is necessary both for tracking across the disk and for retraction of the heads for disk removal. One solution is to provide a long magnetic field; this has been difficult and expensive. Another solution is to make the electric coil long as is illustrated in U.S. Pat. No. 3,576,454 assigned to IBM. A long coil adds weight; but more importantly it increases resistance which reduces efficiency.

A second problem is that of stray flux from the voice coil motor which may tend to damage recorded material. In the past, efforts to remedy the first problem of large excursions has resulted in a trade-off introducing the stray flux problem. Solutions to the above problems have also resulted in some rather awkward mechanical arrangements.

OBJECT AND SUMMARY OF THE INVENTION

It is, therefore, an object of the present invention to provide an efficient voice coil motor with virtually no stray flux.

In accordance with the above object apparatus for converting electrical energy into linear mechanical motion is provided comprising an armature mounted for linear movement along a predetermined axis including an electric coil supported by an elongated slidable element. The coil and element are concentric with the axis. A plurality of magnetic means each have N and S poles along axes perpendicular to the predetermined axis with the magnetic means being concentric with the predetermined axis. First pole piece means are mounted concentrically around the predetermined axis and inside of the magnetic means and forming a magnetic flux path from magnetic poles of a first polarity. The first pole piece means has at least two slots parallel to the predetermined axis. Second pole piece means are mounted concentrically around the predetermined axis and outside of the magnetic means and form a magnetic flux path from magnetic poles of a second polarity. Magnetically permeable means complete a magnetic flux path between the first and second pole piece means. Elongated guide means are disposed in the predetermined axis for guiding the slidable element. The armature includes support means for maintaining the electric coil between the first and second pole piece means including support elements extending through the slots in the first pole piece means connecting the coil to the slidable element.

DETAILED DESCRIPTION OF THE PREFERRED EMBODIMENT

Figure 1:
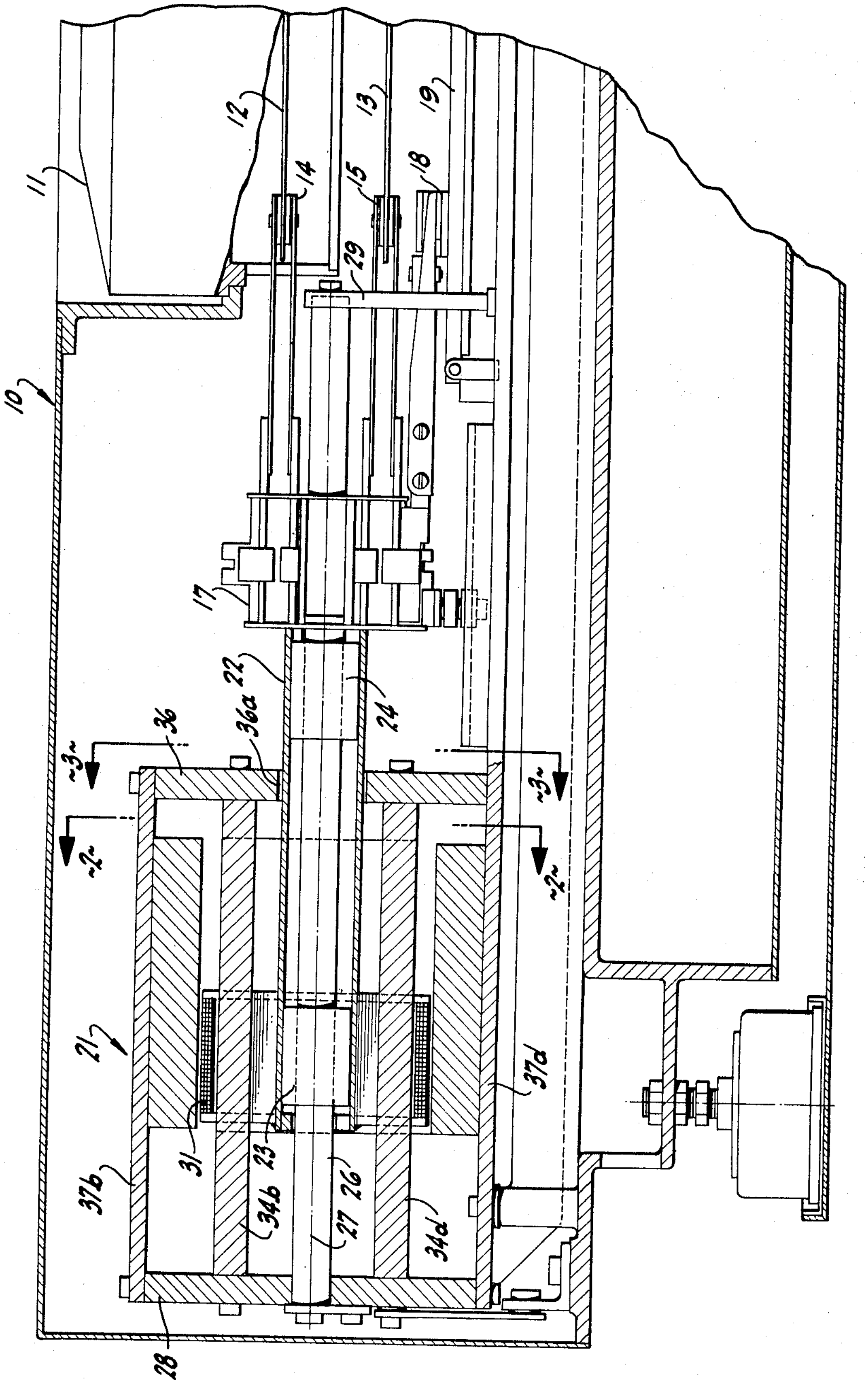
FIG. 1 is an elevation view partially in section of a voice coil motor embodying the present invention along with a portion of a magnetic dick drive unit.

As discussed above, the present invention as illustrated in FIG. 1 is used with a magnetic disk drive unit. This unit is generally contained within a housing 10 which also contains a removable disk memory unit or cartridge 11. Cartridge 11 has a magnetic memory platter or disk 12. Also included within the drive unit is a fixed disk or memory platter 13.

A pair of read/write heads 14 is provided for removable platter 12 and a pair of read/write heads 15 for fixed platter 13. These heads are positionable over any one of a plurality of memory tracks on the platters. Heads 14 and 15 are coupled to a movable carriage 17. Also affixed to carriage 17 is a transducer 18 which in combination with a linear scale 19 provides for servo control of the voice coil motor 21 which moves the carriage 17. Thus, as is apparent, the voice coil motor is included within the general enclosure of the disk drive unit.

In general, the voice coil motor converts electrical energy which is obtained from the servo system, which includes the transducer 18 and linear scale 19, into linear mechanical motion. In actuality this linear motion is provided by a slidable element 22 which couples voice coil motor 21 to carriage 17. Slidable element 22 includes bearings 23 and 24 which slide on a rod 26 which is located along and in an axis 27. Rod 26 is supported at one end by a back plate 28 of the voice coil motor and at the other end by a post 29. Rod 26 extends through an aperture **36*a* in a front plate 36. Thus, rod 26 serves as an elongated guide means for guiding the slidable element 22 which in turn actuates or moves carriage 17 to cause the read/write heads 14 or 15 either to track across the various tracks of the memory platters or to be retracted away from them to allow removal of the cartridge 11**.

Figure 2:
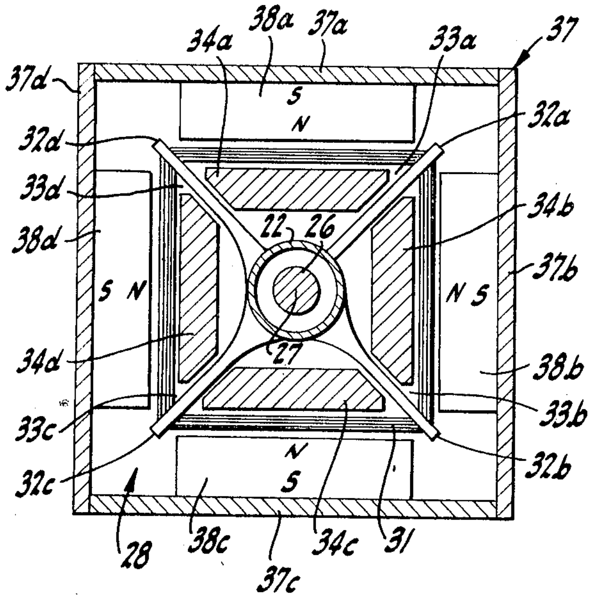
FIG. 2 is a cross-sectional view taken along line 2—2 of FIG. 1.
Figure 3:
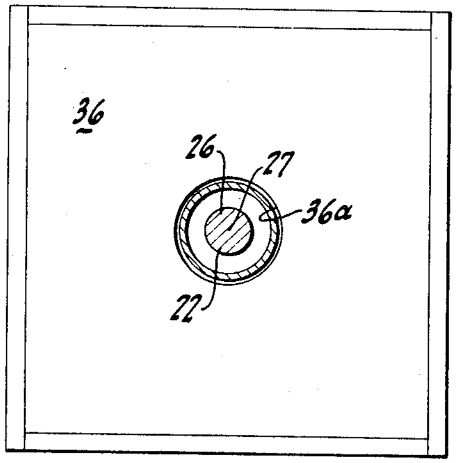
FIG. 3 is a cross-sectional view taken along line 3—3 of FIG. 1.

Slidable element 22 is a part of the armature of the voice coil motor 21 which also includes an electric coil 31. Referring now also to FIGS. 2 and 3, coil 31 has a square cross section and is supported and connected to slidable element 22 by four radially extending support elements **32*a*** through *d*. These support elements respectively extend through the slots **33*a*** through *d* which are formed by the open corners of first pole piece means 34. Such pole piece means consists of four rectangular bars **34*a* through d of magnetically permeable metal which form an elongated enclosure of square cross section with, of course, the corners of the square being open to form the slots 33*a*** through *d*. The bars **34*a* through d are mounted concentrically around axis 27 as illustrated in FIG. 1 by the magnetically permeable end piece or back plate 28 and second end closure or front plate 36**.

Second pole piece means 37 is provided which is also of a square cross section concentric with axis 27 which forms another elongated enclosure to provide a total circumferential enclosure around the voice coil motor. This includes four rectangular plates 37a through d made of magnetically permeable material. A plurality of magnetic means each having N and S poles in the form of rectangularly shaped bars **38*a*** through *d* are affixed to the interiors of the second pole piece means 37 or to the respective plates **37*a*** through *d*. The magnets are polarized as indicated with N and S poles which form axes which are perpendicular to the center axis 27. The magnets 38*a* through *d* are also concentric with axis 27. With the above placement of the magnets there is provided an air gap between the magnets and the first pole piece means 34. Electric coil 31 moves within this air gap. The total magnetic circuit is completed by means of back plate 28 and front plate 36.

OPERATION

From inspection of FIGS. 1, 2 and 3, it is apparent that the magnetic field pattern provided by the unique structure of the present invention provides a totally enclosed and balanced magnetic path for the flux generated by the magnets 38*a* through *d*. Thus, no significant amount of stray flux will extend from the aperture 36*a* in the end plate 36 which would tend to interfere with the magnetic recording on platters 12 and 13. More specifically, magnetic flux, for example, in the case of the "*a*" side of the voice coil motor extends from the N pole of the permanent magnet 38*a* across the air gap to the pole piece 34*a* through such pole piece to the back and front plates 28 and 36 and then back to the S pole of magnet 38*a* through the second pole piece portion 37*a*. All of the other quadrants of the magnetic structure operate similarly and thus there is no tendency for fringing flux to occur at the slots 33*a* through *d* which might eventually cause stray flux to appear through aperture 36*a* in the end plate 36.

From an electrical standpoint, a relatively long magnetic field is provided so that a significant range of movement or excursion of the slidable element may be provided by a relatively narrow width electric coil 31 as best illustrated in FIG. 1. This provides for a low resistance and therefore high efficiency.

Lastly, from a mechanical standpoint, great reliability of operation is provided by reason of the center mass of the moving armature which includes both coil 31, slidable element 22 and its bearings 23 and 24, along with carriage 17, coincides with axis 27; this is also the center of thrust of the electric coil 31. Good mechanical construction is, of course, important in this type of device since great acceleration and deceleration forces are repetitively applied by the servo system because of the nature of the tracking of the read/write heads.

Although the present invention finds preferred use with a magnetic disk drive it is equally useful with other types of devices such as strip files, drums, etc.

Thus, the present invention provides an efficient voice coil motor which has practically no stray flux and thus will not interfere with its associated magnetic recording medium.

I claim:

1. Apparatus for converting electrical energy into linear mechanical motion comprising: an armature mounted for linear movement along a predetermined axis including an electric coil supported by an elongated slidable element said coil having a predetermined width in the direction of said axis, said coil and element being concentric with said axis; a plurality of magnetic means each having N and S poles along axes perpendicular to said predetermined axis said magnetic means being concentric with said predetermined axis said magnetic means having pole faces elongated in the direction of said axis of a length relatively long compared to said width of said coil; first pole piece means mounted concentrically around said predetermined axis and inside of said magnetic means and forming a magnetic flux path from magnetic poles of a first polarity, said first pole piece means having at least two slots parallel to said predetermined axis; second pole piece means mounted concentrically around said predetermined axis and outside of said magnetic means and forming a magnetic flux path from magnetic poles of a second polarity; magnetically permeable means for completing a magnetic flux path between said first and second pole piece means; elongated guide means disposed in said predetermined axis for guiding said slidable element; said armature including support means for maintaining said electric coil between said first and second pole piece means including support elements extending through said slots in said first pole piece means connecting said coil to said slidable element said second pole piece means forming a total circumferential enclosure round said magnetic means said enclosure having two open ends, said means for completing a magnetic flux path totally enclosing one of said ends and said other end except for an aperture through which extends said elongated guide means and said slidable element whereby substantially all of the magnetic flux generated by said magnetic means is contained within said second pole piece means and said magnetically permeable means.

2. Apparatus as in claim 1 where said first pole piece means is an elongated enclosure of square cross-section with the corners of the square being open to form said slots and said second pole piece means is a similar elongated enclosure but with its corners closed.

3. Apparatus as in claim 1 where said magnetic means are affixed to said second pole piece means, an air gap between said magnetic means and said first pole piece means providing a magnetic field through which said electric coil moves when energized by an electric current.

* * * * *

Disclaimer

3,751,693.—*Andrew Gabor,* Danville, Calif. MOVING COIL MOTOR WITH NO STRAY FLUX. Patent dated Aug. 7, 1973. Disclaimer filed Feb. 9, 1981, by the assignee, *Xerox Corp.*

Hereby enters this disclaimer to all claims of said patent.

[*Official Gazette June 23, 1981.*]